(12) United States Patent
Nakanishi et al.

(10) Patent No.: US 11,603,946 B2
(45) Date of Patent: Mar. 14, 2023

(54) ELECTROMAGNETIC VALVE

(71) Applicant: NIDEC TOSOK CORPORATION, Kanagawa (JP)

(72) Inventors: Tomohiko Nakanishi, Kanagawa (JP); Hiroki Shimizu, Kanagawa (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 0 days.

(21) Appl. No.: 17/697,933

(22) Filed: Mar. 18, 2022

(65) Prior Publication Data

US 2022/0307620 A1  Sep. 29, 2022

(30) Foreign Application Priority Data

Mar. 29, 2021 (JP) .............................. JP2021-056233

(51) Int. Cl.
*F16K 31/06* (2006.01)
*F16K 27/02* (2006.01)
*H01F 7/08* (2006.01)

(52) U.S. Cl.
CPC ........ *F16K 31/0675* (2013.01); *F16K 27/029* (2013.01); *F16K 31/0613* (2013.01); *H01F 7/081* (2013.01)

(58) Field of Classification Search
CPC ............. F16K 31/0613; F16K 31/0675; F16K 27/048; F16K 27/029; H01F 2007/086; H01F 7/1607; H01F 7/081; H01F 7/088; H01F 7/126
See application file for complete search history.

(56) References Cited

U.S. PATENT DOCUMENTS

| | | | | |
|---|---|---|---|---|
| 2010/0308244 A1* | 12/2010 | Oikawa | ............... | F16K 11/0716 251/129.15 |
| 2011/0285485 A1* | 11/2011 | Deland | ..................... | H01F 7/16 335/279 |
| 2019/0085999 A1 | 3/2019 | Chen et al. | | |

* cited by examiner

*Primary Examiner* — Kelsey E Cary
(74) *Attorney, Agent, or Firm* — Hauptman Ham, LLP

(57) ABSTRACT

To provide an electromagnetic valve capable of preventing damage due to stress of a buffer member. An electromagnetic valve includes a solenoid having a case, a flow path member, and a columnar valve element that is housed in the valve element housing portion of the flow path member and moves with a plunger of the solenoid to open and close a flow path. A seat member with which the plunger comes into contact is disposed in the case of the solenoid. The seat member includes a core portion with which the plunger comes into contact, and a plurality of protruding portions protruding radially outward from an outer peripheral surface on the radially outer side of the core portion.

10 Claims, 5 Drawing Sheets

ELECTROMAGNETIC VALVE

CROSS-REFERENCE TO RELATED APPLICATIONS

The present invention claims priority under 35 U.S.C. § 119 to Japanese Patent Application No. 2021-056233 filed on Mar. 29, 2021, the entire content of which is incorporated herein by reference.

FIELD OF THE INVENTION

The present invention relates to an electromagnetic valve.

BACKGROUND

Electromagnetic valves in which a flow of a gas or fluid such as water and oil, is switched, that is, electromagnetic valves in which passage and interruption of the fluid are switched are known. Conventional electromagnetic valves are mounted on, for example, a vehicle including an internal combustion engine such as an engine, and can switch between passage and interruption of a blow-by gas.

Such conventional electromagnetic valves each include a nozzle unit having a valve element that opens and closes a flow path through which a fluid passes, and a solenoid unit having a plunger that moves the valve element by excitation.

However, the conventional electromagnetic valve includes a buffer member in some cases in order to prevent a striking sound generated by the plunger coming into direct contact with a yoke disposed in the solenoid unit, but there is a possibility that the buffer member is damaged by the stress generated when the plunger comes into contact with the buffer member.

SUMMARY

According to one aspect of the present invention, an electromagnetic valve includes: a solenoid including a tubular bobbin which has a through-hole penetrating along an axial direction, a plunger inserted into the through-hole and supported so as to be movable along the axial direction, a coil which is wound around an outer peripheral portion of the bobbin and generates a magnetic force as being energized to move the plunger along the axial direction, a tubular yoke disposed between the bobbin and the plunger, and a case which houses the bobbin, the plunger, the coil, and the yoke; a flow path member coupled to the solenoid on one side in the axial direction, the flow path member including a first flow path, a second flow path, a relay flow path connecting the first flow path and the second flow path, and a valve element housing portion having a tubular space connected to the relay flow path; a columnar valve element that is housed in the valve element housing portion and moves along the axial direction together with the plunger to open and close the relay flow path; and a seat member which is disposed in the case of the solenoid on the other side in the axial direction of the plunger and with which the plunger comes into contact. The seat member includes a core portion with which the plunger comes into contact, and a plurality of protruding portions protruding radially outward from an outer peripheral surface on a radially outer side of the core portion.

The above and other elements, features, steps, characteristics and advantages of the present disclosure will become more apparent from the following detailed description of the preferred embodiments with reference to the attached drawings.

DETAILED DESCRIPTION

With reference to FIGS. 1 to 5, an embodiment of an electromagnetic valve of the present invention will be described.

In the following description, three axes orthogonal to each other are set as an X-axis, a Y-axis, and a Z-axis for convenience of description. As an example, an XY-plane including the X-axis and the Y-axis is horizontal, and the Z-axis is vertical.

Further, an X-axis direction is an "axial direction (axis O1 direction)", a radial direction centered on an axis O1 may be simply referred to as a "radial direction", and a circumferential direction centered on the axis O1 may be simply referred to as a "circumferential direction".

Then, the positive side in the X-axis direction corresponds to "one side in the axial direction", and the negative side in the X-axis direction corresponds to "the other side in the axial direction".

In the present specification, a vertical direction, a horizontal direction, an upper side and a lower side are terms used simply to describe a relative positional relation of each part. Therefore, an actual positional relation and the like of each part may be different from a positional relation and the like indicated by these terms.

Figure 1:
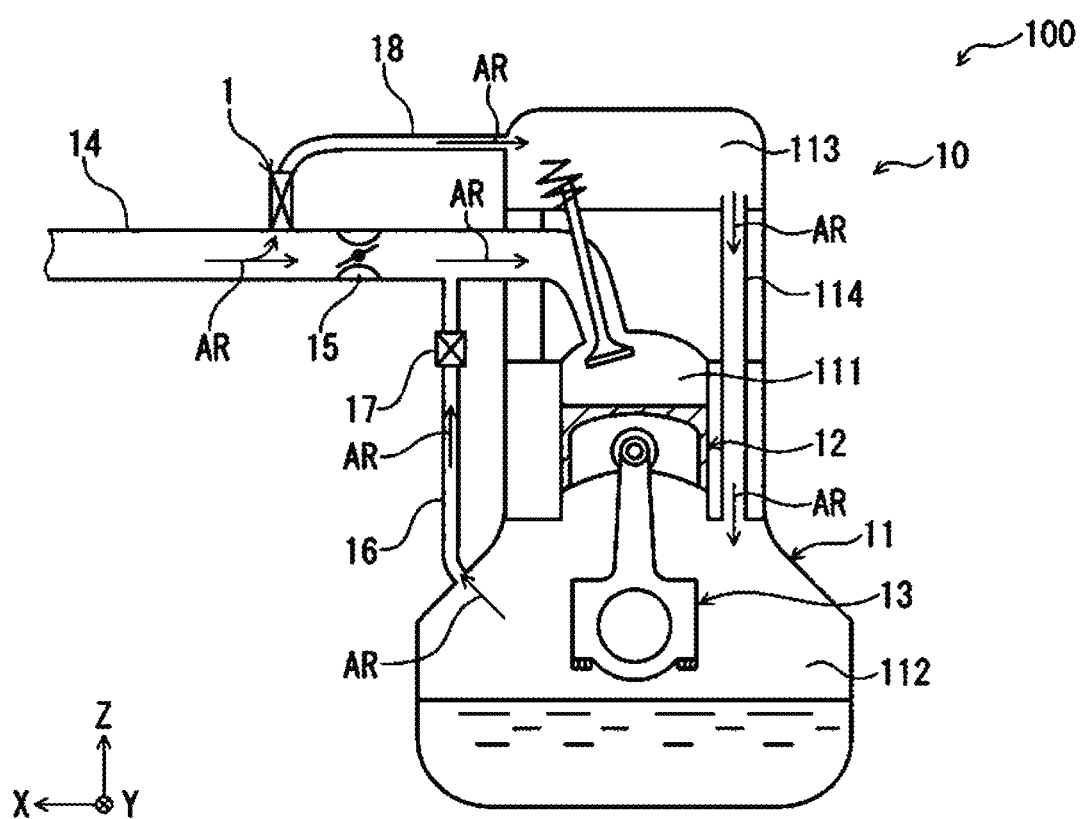
FIG. 1 is a diagram (open state) illustrating an example of a use state of an electromagnetic valve of the present invention.
Figure 2:
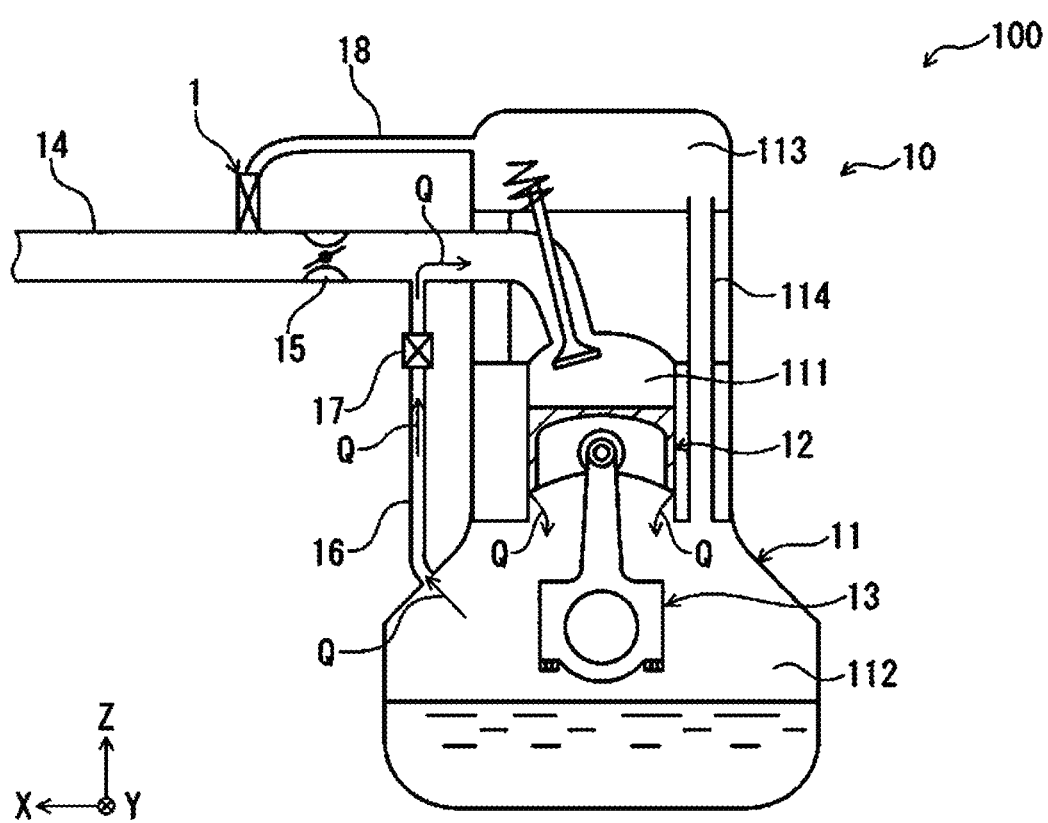
FIG. 2 is a diagram (closed state) illustrating an example of a use state of the electromagnetic valve of the present invention.

As illustrated in FIGS. 1 and 2, an electromagnetic valve 1 is used by being mounted on a vehicle 100 including an internal combustion engine 10 such as an engine, for example.

The internal combustion engine 10 includes a housing 11 having a combustion chamber 111, a crank chamber 112, and a buffer chamber 113, a piston 12 movably provided in the combustion chamber 111, and a crank 13 provided in the crank chamber 112 to convert reciprocating motion of the piston 12 into rotational motion.

In the housing 11, the crank chamber 112 and the buffer chamber 113 are connected using an internal flow path 114.

To the combustion chamber 111, an external flow path 14 is connected from outside the housing 11. The external flow path 14 is provided midway with an electromagnetic valve 15 that is a throttle valve.

The external flow path 14 has a downstream side from the electromagnetic valve 15, being connected to the crank chamber 112 using a first auxiliary flow path 16.

The first auxiliary flow path 16 is provided midway with an electromagnetic valve 17 that is a PCV valve.

The external flow path 14 has an upstream side from the electromagnetic valve 15, being connected to the buffer chamber 113 using a second auxiliary flow path 18. The second auxiliary flow path 18 is provided with the electromagnetic valve 1 of the present invention at a boundary portion between the external flow path 14 and the second auxiliary flow path 18.

The electromagnetic valve 1 switches opening and closing of the external flow path 14. The electromagnetic valve 1 causes the external flow path 14 (see FIG. 1) to be an open state during normal traveling of the vehicle 100, and causes the external flow path 14 (see FIG. 2) to be a closed state during leak detection for detecting a leak of a gaseous mixture AR or the like (hereinafter, also referred to simply as a "leak").

As illustrated in FIG. 1, the open state allows the gaseous mixture AR to pass through the external flow path 14 to flow into the combustion chamber 111, and then the gaseous mixture AR is subjected to combustion. The piston 12 moves due to the combustion of the gaseous mixture AR.

A part of the gaseous mixture AR passing through the external flow path 14 flows into the second auxiliary flow path 18 from the middle of the external flow path 14, and sequentially passes through the buffer chamber 113 and the internal flow path 114 to reach the crank chamber 112.

The gaseous mixture AR having flowed into the crank chamber 112 can return to the external flow path 14 through the first auxiliary flow path 16.

As illustrated in FIG. 2, the closed state allows supply of the gaseous mixture AR to the internal combustion engine 10 to be stopped.

When the combustion chamber 111 has high pressure due to combustion of the gaseous mixture AR, a part of a blow-by gas Q in the combustion chamber 111 passes through the piston 12 to flow into the crank chamber 112.

After that, the blow-by gas Q in the crank chamber 112 flows into the external flow path 14 through the first auxiliary flow path 16.

At this time, when no leak occurs, pressure in the crank chamber 112 decreases with time. When the pressure in the crank chamber 112 falls below a threshold value, it is determined that no leak has occurred.

In contrast, when a leak occurs, the pressure in the crank chamber 112 does not decrease to be prevented from falling below the threshold value, or the pressure is likely to decrease gently to take time to fall below the threshold value. In this case, it is determined that the leak has occurred.

Figure 3:
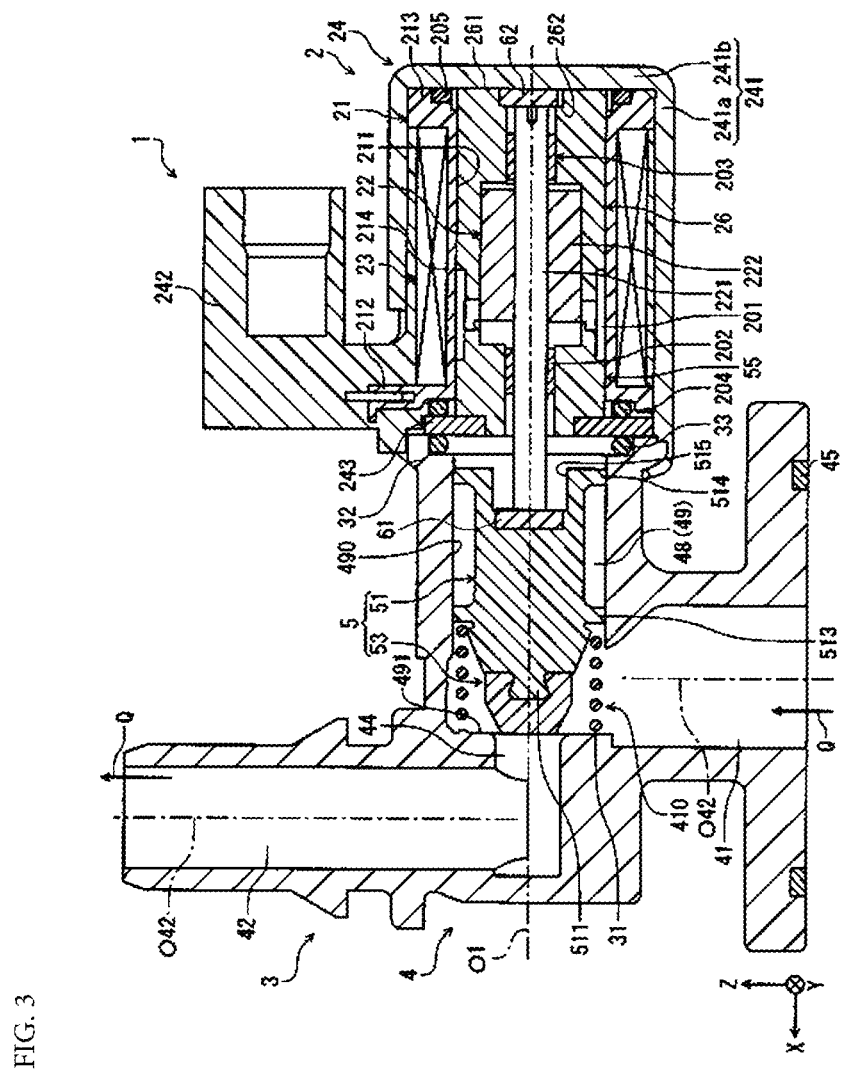
FIG. 3 is a sectional view (open state) illustrating an embodiment of the electromagnetic valve of the present invention.

As illustrated in FIG. 3, the electromagnetic valve 1 includes a solenoid 2 disposed on the negative side in the X-axis direction and a valve mechanism 3 disposed on the positive side in the X-axis direction. Hereinafter, a configuration of each part will be described.

The solenoid 2 includes a bobbin 21, a plunger 22, a coil 23, a case 24, a core 25, and a yoke 26.

The bobbin 21 is a tubular member provided with a through-hole 211. The through-hole 211 penetrates along the X-axis direction. The through-hole 211 has an inner diameter that is constant along the X-axis direction.

The bobbin 21 is provided on the positive side in the X-axis direction with a flange 212 protruding in the radial direction and on the negative side in the X-axis direction with a flange 213 protruding in the radial direction.

The bobbin 21 is made of, for example, various kinds of resin material such as polyester and polyimide.

A coil 23 formed by winding a conductive strand is disposed on an outer peripheral portion 214 of the bobbin 21.

When the coil 23 is energized, a magnetic circuit is formed by the bobbin 21, the core 25, and the yoke 26, thereby generating a magnetic force. This enables the plunger 22 to be moved along the X-axis direction.

The core 25 and the yoke 26 are inserted into the through-hole 211 of the bobbin 21, and the plunger 22 is further inserted inside these. In other words, each of the core 25 and the yoke 26 is located between the bobbin 21 and the plunger 22.

The core 25 is disposed on the positive side in the X-axis direction, and the yoke 26 is disposed on the negative side in the X-axis direction.

The core 25 has a cylindrical shape or a tubular shape as a whole and is disposed along the X-axis direction. The yoke 26 also has a cylindrical shape or a tubular shape as a whole and is disposed along the X-axis direction.

The core 25 and the yoke 26 are each made of a soft magnetic material (soft magnetic metal material) such as iron. As a result, it is possible to generate a magnetic circuit in a level allowing the plunger 22 to be sufficiently moved.

The solenoid 2 includes a coupling member 201 that couples the core 25 and the yoke 26 in a separated state in the X-axis direction in the through-hole 211. The coupling member 201 has a cylindrical shape, and allows an end portion of the core 25 on the negative side in the X-axis direction and an end portion of the yoke 26 on the positive side in the X-axis direction to be fitted therein.

The coupling member 201 is made of a non-magnetic material having resistance to rust (for example, a metal material such as austenitic stainless steel).

The plunger 22 is disposed to straddle the core 25 and the yoke 26, and is supported to be alternately movable to the positive side and the negative side (that is, to be able to reciprocate) along the X-axis direction.

The plunger 22 includes a cylindrical plunger body 222 and a plunger pin 221 inserted in the plunger body 222. The plunger pin 221 protrudes on both the positive and negative sides in the X-axis direction.

A step portion 262 recessed to the positive side in the X-axis direction is formed on an end surface 261 of the yoke 26 on the negative side in the X-axis direction.

The plunger 22 is configured such that the plunger pin 221 is supported by a bush 202 in the core 25, and the plunger pin 221 is supported by a bush 203 in the yoke 26. This enables the plunger 22 to smoothly reciprocate.

The case 24 houses the bobbin 21, the plunger 22, the coil 23, the core 25, and the yoke 26. The case 24 includes a case body 241, a connector member 242, and a ring member 243.

The case body 241 is a bottomed tubular member including a tubular frame portion 241a extending along the X-axis direction and a wall portion 241b that blocks the frame portion 241a on the negative side in the X-axis direction. The yoke 26 is in contact with the wall portion 241b from the positive side in the X-axis direction.

In this state, a seat member (buffer member) 62 is disposed in a space formed by the step portion 262 of the yoke 26 and the wall portion 241b of the case body 241. The seat member 62 is disposed on the opposite side in the X-axis direction of a second seat member 61 disposed on the valve element 5, which will be described later, with the plunger 22 interposed therebetween.

In a state where the valve element 5 is biased to the negative side in the X-axis direction by the coil spring 31, which will be described later, to open the relay flow path 44

(open state), the plunger pin 221 comes into contact (collides) with the seat member 62, so that the movement of the plunger 22 to the negative side in the X-axis direction is restricted.

Further, the seat member 62 is restricted from moving in the radial direction as at least a part of a radially outer end surface of the seat member 62 comes into contact with an inner side surface 263 of the yoke 26.

Figure 4C:
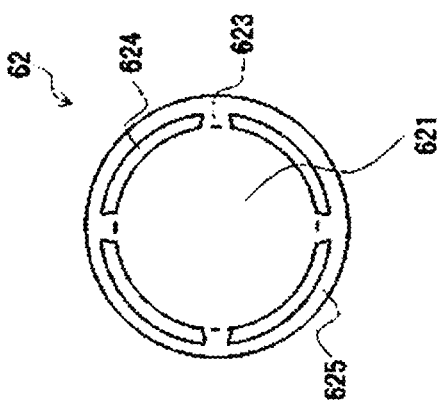
FIGS. 4A to 4C are front views illustrating configurations of a seat member.
Figure 4B:
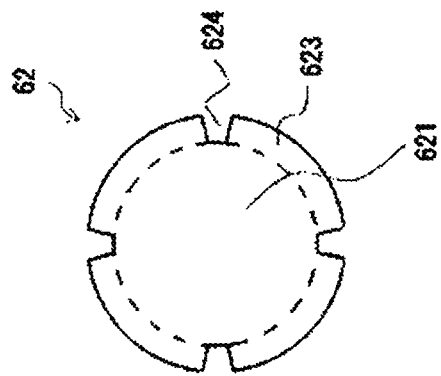
Figure 4A:
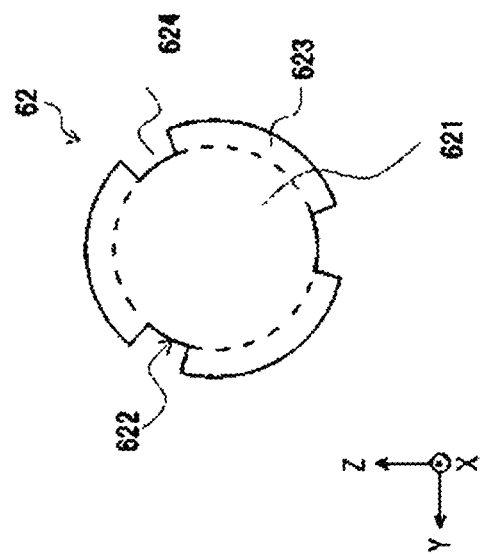

As illustrated in FIGS. 4A to 4C, the seat member 62 includes: a core portion 621 in contact with the negative side in the X-axis direction of the plunger 22; a plurality of protruding portions 623 protruding radially outward from an outer peripheral surface 622 on the radially outer side of the core portion 621; and a gap portion 624 formed by at least the plurality of protruding portions 623. As a result, the plunger 22 collides with the seat member 62, and strain (kinetic energy) due to the stress generated on the seat member 62 is dissipated in the gap portion 624, so that damage of the seat member 62 can be prevented.

Further, the seat member 62 can be fixed to the yoke 26 as the seat member 62 is fitted with at least a part of the radially outer end surface being in contact with and fitted to the inner side surface 263 of the yoke 26, and a shift of the seat member 62 in the radial direction can be reduced.

Further, an elastic modulus of the seat member 62 is smaller than an elastic modulus of the case 24. As a result, it is also possible to absorb wear of the case 24 due to the plunger pin 221 and a collision sound (striking sound) that is likely to occur when the plunger pin 221 directly collides with the case 24 (when the valve is opened), that is, to prevent the occurrence of the collision sound.

Figure 5:
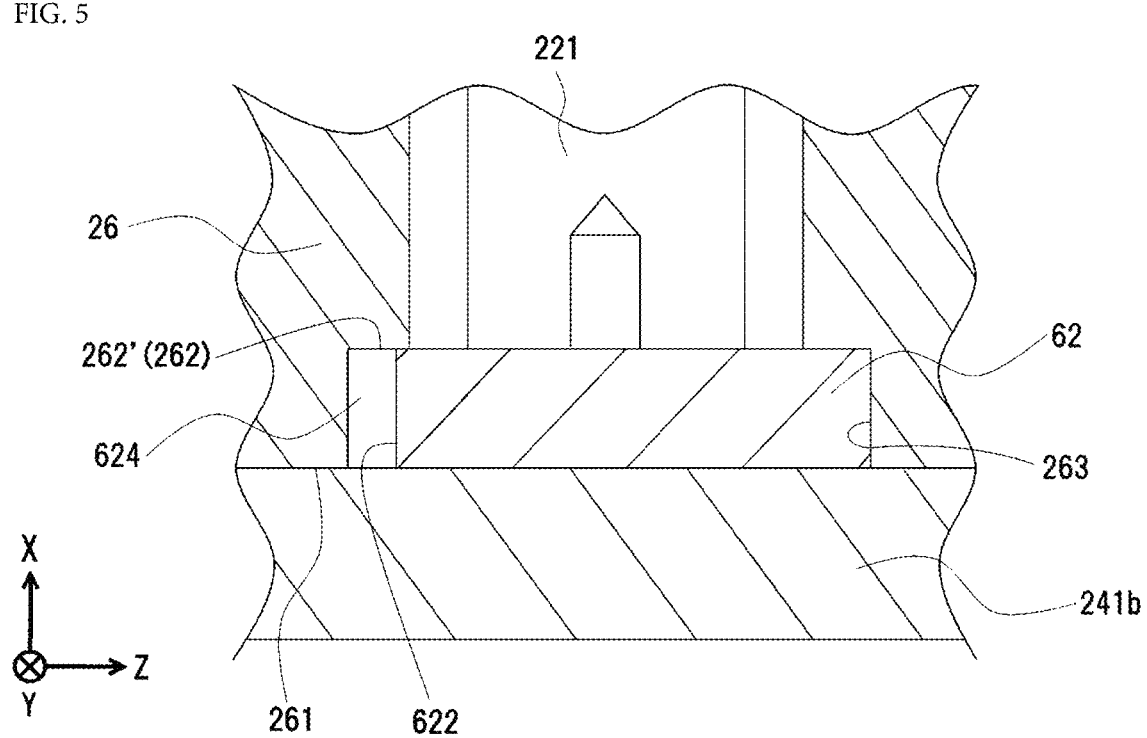
FIG. 5 is a sectional view (open state) illustrating a configuration example of the seat member.

As illustrated in FIG. 5, the seat member 62 is disposed so as to come into contact with of the wall portion 241b on the positive side in the X-axis direction, and in particular, at least a part of the seat member 62 is disposed in the space formed by the step portion 262 and the wall portion 241b, and thus, the seat member 62 can be firmly fixed to the case 24. Note that at least a part of an opposing surface 262' of the step portion 262 opposing the seat member 62 preferably overlaps the core portion 621 in the X-axis direction. As a result, the seat member 62 can be firmly fixed to the case 24. In FIG. 5, at least a part of the outer circumference of the protruding portion 623 is in contact with the inner side surface 263 of the yoke 26.

A specific value of the elastic modulus of the seat member 62 is preferably 200 MPa or more, and more preferably 200 to 1000 MPa. In this case, an effect of reducing the occurrence of the striking sound is further enhanced.

A coefficient of friction of the plunger pin 221 (plunger 22) with respect to the seat member 62 is preferably smaller than a coefficient of friction of the plunger pin 221 with respect to the wall portion 241b of the case 24 (case body 241). As a result, the plunger pin 221 can be easily restored to the original position even when coming into contact with the seat member 62 at a shifted position.

The seat member 62 is preferably made of a resin material. As a result, it is easy to obtain the seat member capable of more effectively exhibiting the above effect. In particular, the resin material is preferably a fluorine-based resin material. In this case, the coefficient of friction of the second seat member 62 can be further reduced.

Note that the seat member 62 in the former case preferably has the plurality of arc-shaped protruding portions 623 disposed to be separated from each other along the circumferential direction of the core portion 621 as illustrated in FIG. 4A, but may adopt another configuration. Since the protruding portion 623 is formed into the arc shape, the contact area with the inner side surface 263 of the yoke 26 can be increased, and the fixing can be performed more firmly.

Specifically, the seat member 62 may include the plurality of arc-shaped protruding portions 623 which are separated from each other along the circumferential direction of the core portion 621 and are disposed at positions opposing each other around the core portion 621 (see FIG. 4B). As a result, the protruding portions 623 opposing each other come into contact with the inner side surface 263 of the yoke 26, and thus, the contact area with the inner side surface 263 of the yoke 26 can be increased, and the fixing can be performed more firmly.

Further, the seat member 62 may include: the plurality of (four in the illustrated configuration) protruding portions 623 protruding radially outward from the core portion 621; an annular portion 625 connected to the protruding portions 623; and a gap portion 624' formed by at least the protruding portions 623 and the annular portion 625. As a result, the contact area with the inner side surface 263 of the yoke 26 can be increased, and the fixing can be performed more firmly.

The ring member 243 has an annular shape, and is disposed on the radially outer side of the core 25 to be concentric with the core 25. The ring member 243 is in contact with the core 25 from the positive side in the X-axis direction.

The case body 241 and the ring member 243 are each made of, for example, a soft magnetic metal material such as iron similarly to the core 25.

The connector member 242 is connected with a connector (not illustrated) used for energizing the coil 23. The connector member 242 is made of, for example, a resin material similarly to the bobbin 21.

The solenoid 2 includes a gasket 204, disposed between the ring member 243 and the flange 212 of the bobbin 21, and a gasket 205, disposed between the wall portion 241b of the case body 241 and the flange 213 of the bobbin 21, which are provided in the case 24.

The gasket 204 has a ring shape, and is disposed on an outer peripheral side of the core 25 to be concentric with the core 25. The gasket 204 is in a compressed state between the ring member 243 and the flange 212 of the bobbin 21. As a result, the gasket 204 airtightly seals a gap between the ring member 243 and the flange 212.

The gasket 205 has a ring shape, and is disposed on the radially outer side of the yoke 26 to be concentric with the yoke 26. The gasket 205 is in a compressed state between the wall portion 241b of the case body 241 and the flange 213 of the bobbin 21. As a result, the gasket 205 airtightly seals a gap between the wall portion 241b and the flange 213.

The gasket 204 and the gasket 205 are each made of an elastic material. The elastic material is not particularly limited, and examples thereof include various rubber materials such as urethane rubber and silicone rubber.

The valve mechanism 3 includes a flow path member 4, a valve element 5, a coil spring (biasing member) 31, and a gasket 33.

The flow path member 4 is coupled to the solenoid 2 on the positive side in the X-axis direction. The flow path member 4 is made of, for example, a resin material similarly to the bobbin 21.

A first flow path 41 and a second flow path 42 are formed in the flow path member 4.

The first flow path 41 extends in the Z-axis direction (direction intersecting the X-axis direction) and is open to the negative side in the Z-axis direction. The first flow path 41 is connected to an external flow path 14 to communicate with the combustion chamber 111 through the external flow path 14.

The flow path member 4 is provided with a gasket 45 fitted from outside to airtightly seal a gap between the flow path member 4 and a pipe constituting the external flow path 14.

The second flow path 42 also extends in the Z-axis direction (direction intersecting the X-axis direction) and is open to the positive side in the Z-axis direction.

The second flow path 42 has a central axis 042 located on the positive side in the X-axis direction with respect to a central axis 041 of the first flow path 41.

The second flow path 42 is connected to, for example, the second auxiliary flow path 18.

In the flow path member 4, a valve element housing portion 49 including a tubular space 48 having a constant diameter along the X-axis direction is formed. The valve element 5 is housed in the tubular space 48 so as to be movable along the X-axis direction.

The first flow path 41 is connected to the tubular space 48 from the negative side in the Z-axis direction via an opening portion 410, and the second flow path 42 is connected to the tubular space 48 from the X side in the X-axis direction via the relay flow path 44. Therefore, the first flow path 41 and the second flow path 42 are connected to each other via the relay flow path 44 and the tubular space 48.

For example, when the internal combustion engine 10 equipped with the electromagnetic valve 1 is a natural intake type engine, the blow-by gas Q flows from the first flow path 41 toward the second flow path 42 through the tubular space 48 and the relay flow path 44 in this order as illustrated in FIG. 3.

Further, the flow path member 4 has a ring-shaped coupling portion 32 at an end portion on the negative side in the X-axis direction as illustrated in FIG. 3. The case body 241 of the solenoid 2 is fixed to the coupling portion 32 by crimping, for example. This causes the solenoid 2 and the flow path member 4 to be coupled to each other.

The gasket 33 is disposed between the coupling portion 32 and the ring member 243 of the solenoid 2 in the compressed state. Further, the gasket 33 has a ring shape and is disposed to be concentric with the tubular space 46.

Due to the presence of the gasket 33, a gap between the coupling portion 32 and the ring member 243 is airtightly sealed. As a result, it is possible to prevent the blow-by gas Q from leaking from a gap between the flow path member 4 and the solenoid 2.

The gasket 33 is made of, for example, an elastic material such as urethane rubber similarly to the gasket 204.

The valve element 5 can move along the X-axis direction together with the plunger 22. The relay flow path 44 can be opened and closed by moving the valve element 5.

In a state (open state) in which the valve element 5 opens the relay flow path 44, the blow-by gas Q can pass from the first flow path 41 to the second flow path 42. Here, FIG. 3 illustrates the open state of the valve element 5.

On the other hand, the passage of the blow-by gas Q from the first flow path 41 to the second flow path 42 is interrupted in a state (closed state) in which the valve element 5 blocks the relay flow path 44.

The valve element 5 has a body portion 51 and a valve portion 53.

The body portion 51 has a columnar shape, and is disposed in the valve element housing portion 49 (tubular space 48) in an attitude in which a central axis thereof extends along the X-axis direction. The body portion 51 is made of a lightweight metal material such as aluminum.

The body portion 51 has a first guide portion 513 and a second guide portion 514.

The first guide portion 513 is provided on an outer peripheral portion of the body portion 51 on the positive side in the X-axis direction. The first guide portion 513 includes an annular collar portion provided continuously along the circumferential direction of the body portion 51. Further, an outer diameter of the first guide portion 513 is constant along the X-axis direction in the present embodiment.

The first guide portion 513 can come into contact with the valve element housing portion 49. As a result, the valve element 5 is guided to slide on an inner peripheral surface 490 of the valve element housing portion 49 when moving along the X-axis direction. Thus, the valve element 5 can move stably, and a deposit attached to the inner peripheral surface 490 can be scraped off to the first flow path 41. As a result, it is possible to prevent a decrease in operating accuracy of the valve element 5.

The direction in which the first flow path 41 extends is not limited to the Z-axis direction (vertical direction), and may be inclined at a predetermined angle with respect to the Z-axis direction. As a result, the deposit scraped off by the first guide portion 513 can be reliably discharged by the first flow path 41.

The predetermined angle is preferably 45° or less, and more preferably 30° or less, from the viewpoint of further improving the effect of discharging the deposit to the first flow path 41.

The second guide portion 514 is provided on the outer peripheral portion of the body portion 51 closer to the negative side in the X-axis direction than the first guide portion 513.

The second guide portion 514 can come into contact with the valve element housing portion 49. As a result, the valve element 5 is guided to slide on an inner peripheral surface 490 of the valve element housing portion 49 when moving along the X-axis direction. Therefore, the valve element 5 can move more stably.

In a state (closed state) in which the valve element 5 closes the relay flow path 44, the second guide portion 514 is located closer to the negative side in the X-axis direction than the opening portion 410 where the first flow path 41 is connected to the tubular space 48. As a result, it is possible to reliably prevent the valve element 5 from falling into the first flow path 41.

The second guide portion 514 may include a collar portion provided continuously along the circumferential direction of the body portion 51 similarly to the first guide portion 513, or may include a plurality of small pieces disposed apart from each other in the circumferential direction.

In the former case, the stability of an attitude of the valve element 5 during movement can be improved. Further, it is possible to prevent the deposit from moving beyond the second guide portion 514 to the solenoid 2 side.

In the latter case, the contact area between the second guide portion 514 and the inner peripheral surface 490 of the valve element housing portion 49 is reduced, and thus, the slidability of the valve element 5 can be easily enhanced.

Further, the inner peripheral surface 490 of the valve element housing portion 49 forms a flat surface. That is, the inner peripheral surface 490 has no irregularity, step, or the like. Therefore, the first guide portion 513 can evenly come into contact along the circumferential direction of the inner peripheral surface 490. Further, the first guide portion 513 can smoothly slide along the X-axis direction. Thus, the effect of scraping off the deposit can be further enhanced.

The body portion 51 has a concave portion 515 recessed to the positive side in the X-axis direction formed at an end portion on the negative side in the X-axis direction. The second seat member 61 is disposed in contact with a bottom surface of the concave portion 515.

The plunger pin 221 presses the valve element 5 (body portion 51) to the positive side in the X-axis direction via the second seat member 61 with an end portion the positive side in the X-axis direction entering the concave portion 515. Such pressing of the plunger 22 can make the valve element 5 move, and the relay flow path 44 can be brought into the closed state.

At this time, the plunger pin 221 does not come into direct contact with the body portion 51, and thus, the wear of the body portion 51 can be suitably prevented regardless of a type of a constituent material of the body portion 51.

An elastic modulus of the second seat member 61 is larger than an elastic modulus of the body portion 51 (valve element 5). A pressing force from the plunger pin 221 can be transmitted to the body portion 51 without being attenuated.

A specific value of the elastic modulus of the second seat member 61 is preferably 200 MPa or more, and more preferably 200 to 1000 MPa. In this case, the effect of transmitting the pressing force is further enhanced.

A coefficient of friction of the plunger pin 221 (plunger 22) with respect to the second seat member 61 is preferably smaller than a coefficient of friction of the plunger pin 221 with respect to the body portion 51 (valve element 5). As a result, the plunger pin 221 can be easily restored to the original position even when coming into contact with the second seat member 61 at a shifted position.

The second seat member 61 is preferably made of a resin material. As a result, it is easy to obtain the seat member capable of more effectively exhibiting the above effect. In particular, the resin material is preferably a fluorine-based resin material. In this case, the coefficient of friction of the second seat member 61 can be further reduced.

Further, a surface of the second seat member 61 on the negative side in the X-axis direction (contact surface with the plunger pin 221) is located between the first guide portion 513 and the second guide portion 514 in the X-axis direction. With this configuration, the plunger pin 221 can be brought into contact with a position on the valve element 5 closer to the positive side in the X-axis direction (position closer to the center of gravity). Therefore, the force from the plunger pin 221 can be stably transmitted to the valve portion 53 via the valve element 5.

The valve portion 53 is disposed on the positive side in the X-axis direction of the body portion 51. As moving together with the plunger 22, the valve portion 53 can approach the relay flow path 44 to close the relay flow path 44, or can separate from the relay flow path 44 to open the relay flow path 44. That is, the valve portion 53 has a function of opening and closing the relay flow path 44.

The valve portion 53 is fixed to a mounting portion 511 that protrudes from the body portion 51 to the positive side in the X-axis direction.

The valve portion 53 is made of, for example, an elastic material such as urethane rubber similarly to the gasket 204.

Further, the valve portion 53 has, for example, a columnar shape. An outer diameter of the valve portion 53 is smaller than an outer diameter of the body portion 51, decreases from the middle of the X-axis direction to the positive side, and is smaller than an inner diameter of the relay flow path 44 at an end portion. As a result, it is possible to prevent the valve portion 53 from coming into contact with the inner peripheral surface 490 of the valve element housing portion 49 and prevent hindrance of the smooth movement of the valve element 5.

Since the end portion of the valve portion 53 on the positive side in the X-axis direction enters the relay flow path 44 in the closed state, the relay flow path 44 can be sealed with higher airtightness.

The coil spring 31 is disposed along the X-axis direction on the positive side in the X-axis direction of the valve element 5. The coil spring 31 is a biasing member that biases the valve element 5 to the negative side in the X-axis direction.

When the energization of the coil 23 is released, the valve element 5 can move to the negative side in the X-axis direction by being biased by the coil spring 31. As a result, the valve portion 53 can be separated from the relay flow path 44 to open the relay flow path 44 to form the open state.

At this time, the coil spring 31 presses the plunger pin 221 (plunger 22) toward the seat member 62 via the valve element 5.

The coil spring 31 is disposed to be concentric with the valve element 5 on the outer peripheral side of the valve element 5. The coil spring 31 of which the positive side in the X-axis direction is in contact with an end surface 491 on the positive side in the X-axis direction of the valve element housing portion 49 and the negative side in the X-axis direction is in contact with the first guide portion (collar portion) 513 (surface 5131 on the positive side in the X-axis direction) of the valve element 5, thereby forming a compressed state. As a result, the coil spring 31 can stably bias the valve element 5 without excess or deficiency.

When the first guide portion (collar portion) 513 is used as a spring seat, the flow path member 4 can be downsized. Further, the contact area between the coil spring 31 and the first guide portion 513 can be increased, and the area of a region where the deposit can adhere can be reduced.

Further, the use of the first guide portion 513 as the spring seat contributes to downsizing of the electromagnetic valve 1, and the region where the deposit adheres can be also reduced on the positive side in the X-axis direction than the first guide portion 513 on the valve element housing portion 49.

A separation distance between the first guide portion 513 and the inner peripheral surface 490 of the valve element housing portion 49 is preferably smaller than a wire diameter of the coil spring 31. As a result, it is possible to suitably prevent the coil spring 31 from entering a gap between the first guide portion 513 and the inner peripheral surface 490 of the valve element housing portion 49, and the coil spring 31 from coming out of the valve element 5.

However, the separation distance between the first guide portion 513 and the inner peripheral surface 490 of the valve element housing portion 49 is preferably as large as possible as long as being smaller than the wire diameter of the coil spring 31. As a result, a part of the deposit can be moved to the negative side in the X-axis direction of the first guide portion 513, and thus, the amount of the deposit remaining on the positive side in the X-axis direction of the first guide portion 513 can be further reduced.

The outer diameter of the first guide portion 513 is preferably larger than an inner diameter of the coil spring 31. As a result, it is possible to more reliably prevent the coil spring 31 from entering the gap between the first guide portion 513 and the inner peripheral surface 490 of the valve element housing portion 49.

Further, a part of the first guide portion 513 in the X-axis direction is exposed to the opening portion 410 in which the first flow path 41 is open to the tubular space 48 in the closed state. With such a configuration, the effect of scraping off the deposit to the first flow path 41 can be further improved.

The first guide portion 513 may be configured to be located inside the valve element housing portion 49 in the closed state by decreasing a length along the X-axis direction. With such a configuration, it is possible to reliably prevent the valve element 5 from falling from the valve element housing portion 49.

Further, a length of the first guide portion 513 along the axial direction may be formed so as to decrease outward in the radial direction. In this case, the contact between the first guide portion 513 and the inner peripheral surface 490 of the valve element housing portion 49 can be made as line contact (the contact area can be reduced) to prevent a decrease of the slidability of the valve element 5.

In particular, it is preferable that the surface 5131 of the first guide portion 513 on the positive side in the X-axis direction be substantially perpendicular to the X-axis direction, and a surface 5132 on the negative side in the X-axis direction be inclined with respect to the X-axis direction. As a result, the effect of scraping off the deposit and the function of the first guide portion 513 as the spring seat can be satisfactorily exhibited.

When the first guide portion 513 is configured to be located inside the valve element housing portion 49 in the closed state, the distance between the surface 5131 on the positive side in the X-axis direction and the opening portion 410 is preferably smaller than the wire diameter of the coil spring 31. As a result, the effect of preventing the valve element 5 from falling from the valve element housing portion 49 and the effect of scraping off the deposit can be exhibited in a well-balanced manner.

Although the electromagnetic valve of the present invention has been described with reference to the illustrated embodiment, the present invention is not limited thereto, and each part constituting the electromagnetic valve can be replaced with a part having any configuration capable of exhibiting similar functions. Further, any component may be added.

Although the electromagnetic valve 1 is mounted and used in the vehicle 100 equipped with the internal combustion engine 10, such as an engine, in the above embodiment, the application place of the electromagnetic valve is not limited to the vehicle 100. Further, the fluid that is switched between passage and interruption by the electromagnetic valve 1 is not limited to the gas (blow-by gas Q), and may be a liquid or a mixture of a gas and a liquid.

Although the electromagnetic valve 1 is configured to allow the blow-by gas Q to flow from the first flow path 41 toward the second flow path 42 in the above embodiment, the blow-by gas Q can also be allowed to flow from the second flow path 42 toward the first flow path 41 depending on a use state of the electromagnetic valve 1.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. An electromagnetic valve comprising:
   a solenoid including a tubular bobbin which has a through-hole penetrating along an axial direction, a plunger inserted into the through-hole and supported so as to be movable along the axial direction, a coil which is wound around an outer peripheral portion of the bobbin and generates a magnetic force as being energized to move the plunger along the axial direction, a tubular yoke disposed between the bobbin and the plunger, and a case which houses the bobbin, the plunger, the coil, and the yoke;
   a flow path member coupled to the solenoid on one side in the axial direction, the flow path member including a first flow path, a second flow path, a relay flow path connecting the first flow path and the second flow path, and a valve element housing portion having a tubular space connected to the relay flow path;
   a columnar valve element that is housed in the valve element housing portion and moves along the axial direction together with the plunger to open and close the relay flow path; and
   a seat member which is disposed in the case of the solenoid on another side in the axial direction of the plunger and with which the plunger comes into contact,
   wherein the seat member includes a core portion with which the plunger comes into contact, and a plurality of protruding portions protruding radially outward from an outer peripheral surface on a radially outer side of the core portion.

2. The electromagnetic valve according to claim 1, wherein the seat member is fitted with at least a part of a radially outer end surface being in contact with an inner side surface of the yoke.

3. The electromagnetic valve according to claim 1, wherein the seat member includes:
   an annular portion connecting the plurality of protruding portions; and
   a gap portion formed by at least one the protruding portions and the annular portion.

4. The electromagnetic valve according to claim 1, wherein
   the case includes: a tubular frame portion extending along the axial direction; and a wall portion that blocks the frame portion on the other side in the axial direction,
   the yoke includes a step portion, recessed to one side in the axial direction, on an end surface on the other side in the axial direction, and
   at least a part of the seat member is disposed in a space formed by the step portion of the yoke and the wall portion of the case.

5. The electromagnetic valve according to claim 1, wherein a coefficient of friction of the plunger with respect to the seat member is smaller than a coefficient of friction of the plunger with respect to the case.

6. The electromagnetic valve according to claim 1, wherein an elastic modulus of the seat member is 200 MPa or more.

7. The electromagnetic valve according to claim 1, wherein the seat member is made of a resin material.

8. The electromagnetic valve according to claim 7, wherein the resin material is a fluorine-based resin material.

9. The electromagnetic valve according to claim 1, wherein the valve element housing portion is provided with a biasing member, which biases the valve element to the other side in the axial direction, inside.

10. The electromagnetic valve according to claim 9, wherein the valve element is biased by the biasing member to move to the other side in the axial direction while being in contact with an inner peripheral portion of the valve element housing portion.

\* \* \* \* \*